United States Patent [19]

Shepard

[11] 4,313,037
[45] Jan. 26, 1982

[54] TELEPHONE STATION SET WITH IMPROVED FLASH SIGNALLING

[75] Inventor: Robert R. Shepard, Fremont, Calif.

[73] Assignee: Rolm Corporation, Santa Clara, Calif.

[21] Appl. No.: 155,109

[22] Filed: Jun. 2, 1980

[51] Int. Cl.³ ............................................. H04M 1/00
[52] U.S. Cl. .............................. 179/81 R; 179/84 R
[58] Field of Search ................. 179/81 R, 84 R, 18 F, 179/18 FA, 84 A

[56] References Cited

U.S. PATENT DOCUMENTS 4,086,440  4/1978  Hurle ................................ 179/81 R
4,251,693  2/1981  Christiansen ..................... 179/81 R

FOREIGN PATENT DOCUMENTS 2432452  1/1976  Fed. Rep. of Germany .... 179/81 R

Primary Examiner—Raymond F. Cardillo, Jr.
Assistant Examiner—J. A. Popek
Attorney, Agent, or Firm—Blakely, Sokoloff, Taylor & Zafman

[57] ABSTRACT

An improved telephone station set for use with a switching system which senses flashing is disclosed. A separate flash key is included on the set. Depression of the flash key causes decoupling of the set for a predetermined time which corresponds to the flash window. Depression of the hook switch, assures decoupling of the set for a sufficiently long period of time so that a hang-up is detected even if the hook switch is immediately released.

3 Claims, 3 Drawing Figures

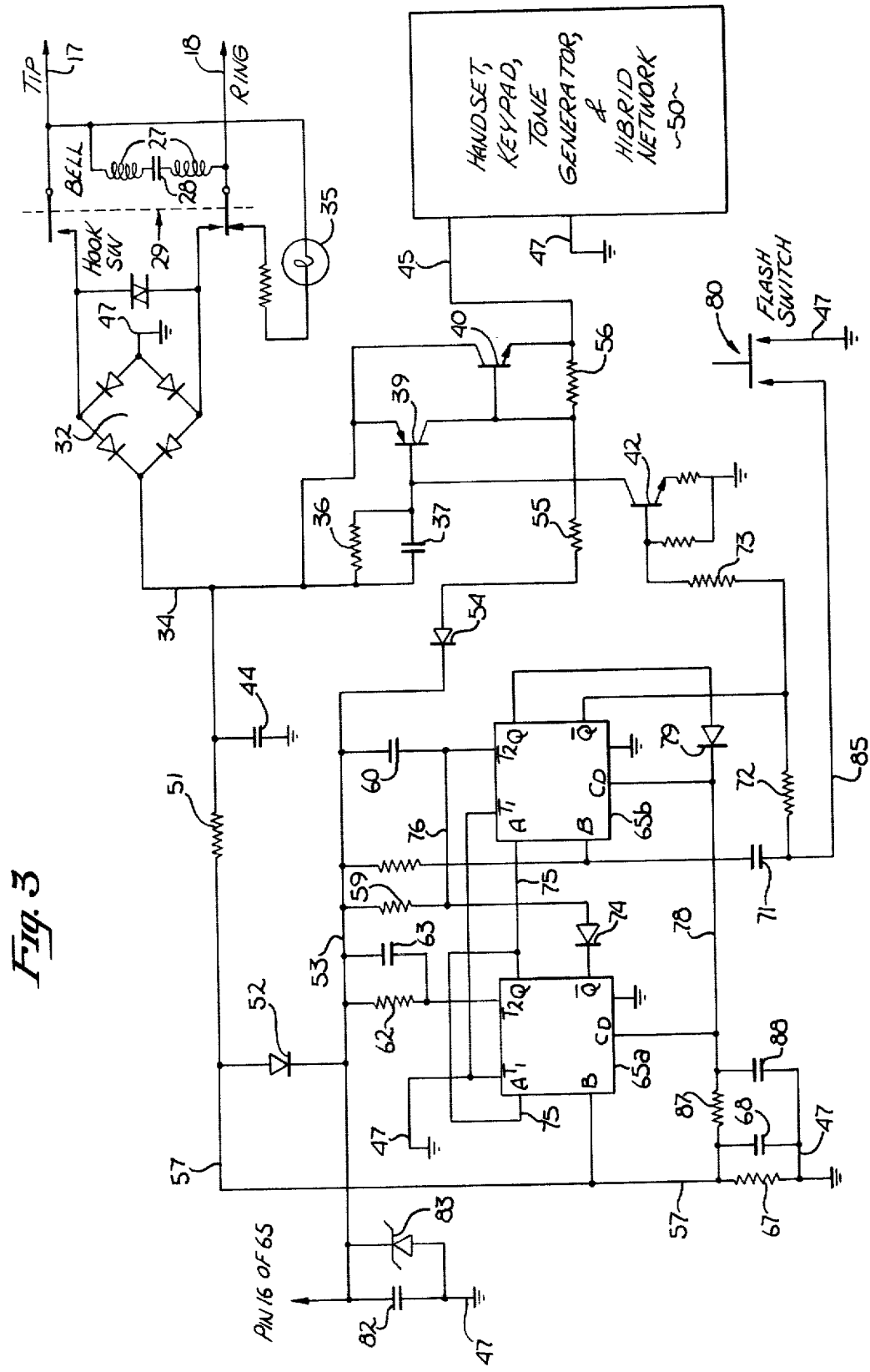

4,313,037

TELEPHONE STATION SET WITH IMPROVED FLASH SIGNALLING

BACKGROUND OF THE INVENTION

1. Field of the Invention

The invention relates to the field of telephone station sets, particularly those employing hook switches.

2. Prior Art

Typically, in telephony, a handset or the like, rests on a hook switch. Lifting the handset from the hook switch couples the set to a pair of leads (TIP and RING); this off-hook condition is detected by sensing current flow which increases. Likewise, restoring the handset to the cradle depresses the hook switch, permitting an on-hook condition to be sensed.

In some telephony systems, the duration of the on-hook or off-hook condition is used as a means for transmitting additional information. Generally, the hook switch is manually (and rapidly) depressed, providing "flashing". This hook switch flashing in some systems accesses features such as call transfer, establishment of conference calls, parking, hold and others. By way of example, a private branch exchange (PBX) may have a flash window between 300-900 msec. If the current is interrupted for greater than 900 msec. (typically 1.5 seconds), a hang-up is assumed.

A problem with hook switch flashing is that it relies upon the caller's sense of timing and is considered by some to be inconvenient. A caller, after completing one call, may manually depress the hook switch, but only momentarily before beginning another call. This momentary depression, if interpreted as a flash, can result in a phantom ring-back. In other instances, a caller may depress the hook switch for too long a period, and then an intended flash may be interpreted as a hang-up.

As will be seen, the present invention provides a telephone station set with a separate flash button. Depression of the flash button assures flash signalling; depression of the hook switch assures the signalling of a hang-up.

SUMMARY OF THE INVENTION

An improved telephone station set having a hook switch and which draws a certain range of current when the switch is in the off-hook position is described. A manual key for flashing is disposed on the set near the keypad. The set includes an electrical switching means, activated by a control signal, for substantially decoupling the set from the line. Timing means, which is coupled to the hook switch and to the flash key, generates the control signal. The timing means provides a control signal of a first period when the hook switch is moved to the on-hook position, and a control signal of a second period when the manual switch is depressed. In this manner, a reliable determination of a hang-up or flash can be made by sensing the duration of the decoupling of the set from the line.

BRIEF DESCRIPTION OF THE DRAWINGS

FIG. 3 is an electrical schematic of the presently preferred embodiment of the invention.

DETAILED DESCRIPTION OF THE INVENTION

A telephone station set is described which enables substantially improved detection of both flashing and hang-up. In the following description, numerous specific details are set out such as specific part numbers, time periods, etc., to provide a thorough understanding of the present invention. However, it will be obvious to one skilled in the art that the present invention may be practiced without these specific details. In other instances, well-known circuits have been shown in block diagram form in order not to obscure the present invention in unnecessary detail.

Figure 1:
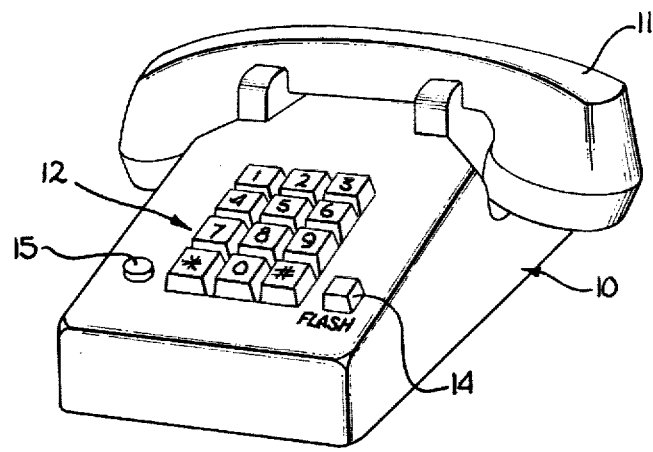
FIG. 1 is a perspective view of a telephone station set having a flash key.

Referring first to FIG. 1, a telephone station set 10 is illustrated which includes a handset 11. The telephone station set 10 includes customary components such as a keypad 12 and a message light 15. The handset 11 rests within a cradle and while in the position shown, depresses the hook switch in a usual manner. In some telephone systems as previously mentioned, manual depression of the hook switch is used for separate signalling. This hook switch flashing selects a plurality of features, depending on the particular PBX or other system to which the set is connected. With the present invention, as will be described, a separate flash key 14 is used instead of the hook switch flashing.

Figure 2:
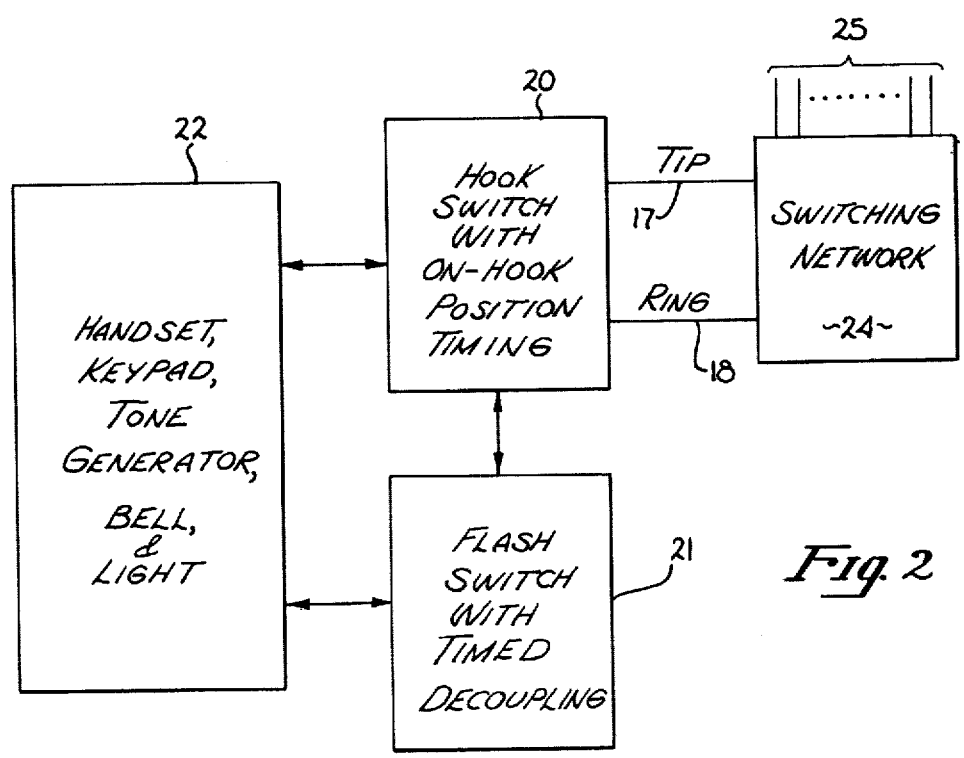
FIG. 2 is a block diagram illustrating the present invention.

In FIG. 2, the station set is shown as blocks 20, 21 and 22. The blocks are coupled through a pair of leads, TIP lead 17 and RING lead 18, to a switching network 24. A plurality of other lead pairs 25 are also coupled to the switching network. The network 24 may be any one of a plurality of known switching networks, such as PBXs, particularly those which detect hook switch flashing.

The components of the station set which are unaltered by the present invention, such as the handset, keypad, tone generator, bell, light, etc., are shown in FIG. 2 as block 22. The present invention provides that once the hook switch is depressed (even if only momentarily), decoupling from lines 17 and 18 occurs for a sufficient duration to be detected as a hang-up by network 24. This is indicated by block 20 as "hook switch with on-hook position timing." The flash key with its switch, once depressed will similarly decouple leads 17 and 18 from the set, however, the duration of this decoupling is timed for detection by network 24 as a flash. In FIG. 2, this is indicated by block 21 as "flash switch with timed decoupling".

In FIG. 3, the circuit of the present invention is again shown coupled to leads 17 and 18. These leads are coupled to a bell 27 through a capacitor 28. As is customary, the AC responsive bell remains permanently coupled to leads 17 and 18, however, because of capacitor 28, the bell only responds to an AC signal (e.g., 100 volts rms). The leads 17 and 18 are coupled to the hook switch 29; for the position shown, the hook switch is in the on-hook position. When moved to the off-hook position, leads 17 and 18 are coupled through the diode bridge 32, to the components of the station set shown within block 50. These prior art components include the handset, keypad, tone generator, and a hybrid network used to interconnect the handset with line 45. The line 45 provides the audio path and DC power for the components of block 50.

Also shown in FIG. 3 is a message light 35 which is coupled to the leads 17 and 18 through a resistor when the hook switch is in the on-hook position. Typically, a DC voltage applied to these leads illuminates light 35.

In the presently preferred embodiment, a neon bulb is used, requiring a voltage of approximately 100 volts before the bulb will light.

Coupling between the leads 17 and 18 and block 50 occurs through line 34, transistor 40 and line 45. When transistor 40 ceases to conduct, the circuit shown generally to the left of transistor 39, draws very little current (e.g., 1 mamp), provided the hook switch is in the off hook position, otherwise no DC current is drawn. This substantial decoupling by transistor 40 is detected as an on-hook or flashing condition depending upon the duration of the decoupling.

In general, once the flash switch 80 (which corresponds to key 14 of FIG. 1) is depressed, it activates a "one-shot" multivibrator 65b causing transistor 40 to cease conducting for approximately 600-700 msec., in the presently preferred embodiment. Thus, the time constant associated with the multivibrator 65b controls the flashing time period. When the hook switch is moved to the on-hook position, multivibrator 65a is triggered, which immediately triggers multivibrator 65b. This prevents transistor 40 from conducting even if the hook switch is immediately released. The duration of this deactivation is controlled by the time constants associated with both the multivibrators 65a and 65b. These time constants are sufficiently long to assure that a hang-up is detected. In the presently preferred embodiment, once the hook switch is depressed, decoupling is assured for approximately 1.5 sec.

The transistor 39 is coupled to transistor 40 in a connection resembling a Darlington pair. Specifically, the emitter of the pnp transistor 39 is coupled to the collector of the npn transistor 40. The base of transistor 40 is coupled directly to the collector of transistor 39. Two separate signal sources control transistor 39 through its base. One signal source is from transistor 42 and the other from resistor 36 and capacitor 37. During typical voice communications, transistors 39, 40 and 42 are all conducting.

When the hook switch is in the off-hook position, leads 17 and 18 are coupled directly to the diode bridge 32. (While typically lead 17 is positive with respect to lead 18, in the event this polarity is reversed, diode bridge assures that line 34 is positive relative to the ground 47.) The signal on line 34 is coupled directly to the emitter of transistor 39 and the collector of transistor 40. The base of transistor 39 also receives this signal as mentioned, primarily through resistor 36. For a typical off-hook condition, transistor 39 conducts, causing transistor 40 to conduct, and allowing free signal flow from leads 17 and 18 through line 34, transistor 40, line 45 into the component shown within block 50. Note that the signal return path includes the ground 47 which is referenced to the diode bridge 32.

The capacitor 37 assures that a ramp function is applied to transistor 39, and hence, transistor 40 does not abruptly turn-on. Without this capacitor, an annoying "click" may be heard in the receiver under certain circumstances. If, for example, the flash switch 80 is pressed while the receiver is in the listening position, without the capacitor 37, transistor 40 would abruptly stop conducting causing a loud "click". A similar click would be heard when transistor 40 began conducting at the end of the timeout period.

Power to the multivibrators 65a and 65b is provided from line 53. For the most part, this power flows from the collector of transistor 39, through resistor 55, and diode 54. The power is regulated to approximately 5 volts, in the presently preferred embodiment, by the zener diode 83. As will be described, capacitor 82 provides storage of energy to assure that the multivibrators remain functioning immediately after a hang-up. The diode 54 prevents this energy from flowing back into the components shown within block 50. Immediately after going off-hook, when leads 17 and 18 are coupled to the diode bridge power is also delivered to line 53 through resistor 51 and diode 52. Any high frequency components generated by 65 are filtered by the action of resistor 51 and capacitor 44.

In the presently preferred embodiment, the multivibrators 65a and 65b are packaged in a single package which is sold commercially as Part No. MC14538. Pin 16 of this package receives power for the multivibrators from line 53. The $T_1$ terminals of multivibrators 65a and 65b are coupled to ground. The time constant associated with the multivibrator 65a is determined by the RC combination, resistor 62 and capacitor 63. With the multivibrator in its stable state ($\overline{Q}$ high-Q low), capacitor 63 is discharged (both of its terminals at 5 volts). When the multivibrator is triggered, capacitor 60 is charged since $T_2$ is brought momentarily to ground. Then capacitor 60 is discharged through resistor 62 to set the circuit back to its stable state. Likewise, the time constant associated with multivibrator 65b is determined by resistor 59 and capacitor 60.

The terminal $T_2$ and multivibrator 65b (line 76) are also coupled through diode 74 to the $\overline{Q}$ terminal of the multivibrator 65a, for reasons which will be explained later. The Q terminal of multivibrator 65a is coupled to its A terminal and to the A terminal of multivibrator 65b by line 75. The B terminal of multivibrator 65a is coupled to line 57. This line is coupled to line 34 through resistor 51 and to ground through the parallel combination of resistor 67 and capacitor 68. The $C_D$ terminals of both multivibrators are coupled to line 78. This line is coupled to the Q terminal of multivibrator 65b through diode 79. The B terminal of multivibrator 65b, through capacitor 71, is coupled to one terminal of the switch 80 and to resistor 72. The other end of resistor 72 is coupled to the $\overline{Q}$ terminal of multivibrator 65b and to the base of transistor 42 through resistor 73. The emitter of transistor 42 is coupled to ground through a resistor and its collector is coupled to the base of transistor 39.

Assume for purposes of discussion that during the course of a call, the caller wishes to select a feature through flash signalling. To do this, switch 80 is depressed. This causes line 85 to be brought to ground potential and through capacitor 71, drops the potential at terminal B of multivibrator 65b. This, in turn, forces the multivibrator into its nonstable state, that its, $\overline{Q}$ low and Q high. With $\overline{Q}$ low, a the current through resistor 73 into the base of transistor 42 is shut off. This transistor stops conductng which stops the flow of current out of the base of transistor 39. Transistor 39 ceases to conduct and this causes transistor 40 to cease conducting. As mentioned, when this occurs, all the components shown within block 50 are decoupled from leads 17 and 18 and substantially no current is drawn from these leads.

Approximately 600-700 msec later, capacitor 60 is discharged through resistor 59 bringing terminal $T_2$ of multivibrator 65b back to approximately 5 volts. When this occurs, the multivibrator changes to its stable state and $\overline{Q}$ returns to a 5 volt potential. Transistor 42 then starts to conduct causing both transistors 39 and 40 to conduct. The time constant associated with the capacitor 71 and the resistor 72 prevent repeated depressions of switch 80 from effecting the orderly cycling of multivibrator 65b as just described.

Thus, once the flash switch 80 is depressed, a PBX or the like, coupled to the station set will detect flash signalling.

Assume now that the hook switch 29 is depressed. When this occurs, line 34 quickly drops to ground potential. (Note the line is discharged through transistor 40 and line 45.) This ground potential is sensed at the B terminal of multivibrator 65a forcing this multivibrator into its unstable state and charging capacitor 63. (Capacitor 82 which was previously charged, assures that there is sufficient voltage on line 53 to complete the following cycle. Note diodes 52 and 54 prevent discharge of capacitor 82.) The change of state of multivibrator 65a forces multivibrator 65b to also change state since the Q terminal of multivibrator 65a is coupled to the A terminal of multivibrator 65b. Again, as previously described, the $\overline{Q}$ terminal of multivibrator 65b drops in potential, turning off transistor 42. If at this moment the hook switch is released and a potential flows from line 34 to the collector of transistor 40, transistor 40 will not conduct because transistors 39 and 42 are not conducting. Thus, once the hook switch is depressed, even if it is immediately released, the components associated with block 50 will remain decoupled from leads 17 and 18 and an on-hook condition will be sensed.

The time constant associated with the capacitor 63 is approximately 1 second. When capacitor 63 discharges, T2 is again brought to approximately 5 volts in turn causing the multivibrator 65a to assume its stable state. This switching, in turn, allows capacitor 60 to begin discharging. Up until this time, the capacitor 60 was prevented from discharging since it was coupled through line 76 and diode 74 to the ground potential at the $\overline{Q}$ terminal of multivibrator 65a. After capacitor 60 discharges, multivibrator 65b changes to its stable state and the current flows into the base of transistor 42. Under these circumstances, if the hook switch is now released, coupling can occur between the station set and leads 17 and 18.

Thus, transistor 40 is prevented from conducting for a period of time corresponding to the time constants associated with both the multivibrators. In the presently preferred embodiment, this is approximately 1.5 seconds. This assures that a hang-up will be detected once the hook switch is depressed.

A problem can occur when going off-hook during the ringing interval. Ringing pulses on line 57 can cause multivibrator 65a to be triggered through its B terminal. To prevent this, resistor 87 and capacitor 88 apply a reset signal (low) to the CD terminals of both multivibrators for approximately 1 second after initial power-up. Diode 79 prevents the discharge of capacitor 88 immediately after hang-up.

Thus, a station set has been described which provides improved flashing capability. Depression of the hook switch assures decoupling of the set from its leads for a sufficiently long period of time so that a hang-up is detected. Depression of the flash key causes decoupling for a shorter period of time such that a flash signal is detected. The loop powered circuit providing this switching does not draw substantial current, and thus does not affect the overall operation of the station set.

I claim:

1. In a telephone station set coupled to a switching system adapted to detect when said set is drawing a certain range of current, said set having a hook switch which, in a first position, corresponding to an off-hook condition, electrically couples said set to said system, and in a second position, corresponding to an on-hook condition, electrically decouples said set from said system, an improvement comprising:

(a) a flash switch;

(b) a first multivibrator electrically coupled to said flash switch such that upon manually closing said flash switch, when said hook switch is in said first position, said first multivibrator is triggered and remains in its triggered state for a first predetermined period of time;

(c) a transistor switch electrically coupled to an output of said first multivibrator and said system, said transistor switch adapted to substantially cease conducting while said first multivibrator is in its triggered state thereby causing said set to draw a current less than said certain range of current;

(d) a second multivibrator with an input coupled to said hook switch and an output electrically coupled to said first multivibrator, such that upon a change from said off-hook condition to said on-hook condition, said second multivibrator is triggered and remains in its triggered state for a predetermined second period of time, said first multivibrator adapted to remain in its triggered state for a period of time equal to approximately the time said second multivibrator is in its triggered state plus said first predetermined period of time;

whereby two distinct conditions may be detected by said system by sensing the duration of current flow within said certain range of current which is drawn by said set.

2. The improvement defined by claim 1 wherein said first predetermined period of time is longer than said second predetermined period of time.

3. The improvement defined by claim 1 including capacitance storage means for providing power for said second multivibrator for at least as long as said second predetermined period of time.

* * * * *